United States Patent [19]
Miller

[11] Patent Number: 6,044,189
[45] Date of Patent: Mar. 28, 2000

[54] TEMPERATURE COMPENSATED FIBER BRAGG GRATINGS

[75] Inventor: Calvin M. Miller, Naples, Fla.

[73] Assignee: Micron Optics, Inc., Atlanta, Ga.

[21] Appl. No.: 08/984,245

[22] Filed: Dec. 3, 1997

Related U.S. Application Data

[63] Continuation-in-part of application No. 08/833,602, Apr. 9, 1997, Pat. No. 5,838,437, which is a continuation-in-part of application No. 08/897,474, Jul. 21, 1997, Pat. No. 5,892,582

[60] Provisional application No. 60/031,562, Dec. 3, 1996.

[51] Int. Cl.[7] ..................................................... G02B 6/34
[52] U.S. Cl. ............................... 385/37; 385/10; 385/137
[58] Field of Search .................................. 385/10, 13, 37, 385/137

[56] References Cited

U.S. PATENT DOCUMENTS

| | | | |
|---|---|---|---|
| 4,806,012 | 2/1989 | Meltz et al. | 356/32 |
| 5,042,898 | 8/1991 | Morey et al. | 385/37 |
| 5,380,995 | 1/1995 | Udd et al. | 250/227.18 |
| 5,397,891 | 3/1995 | Udd et al. | 250/227.18 |
| 5,591,965 | 1/1997 | Udd | 250/227.18 |
| 5,615,224 | 3/1997 | Cohen | 372/36 |
| 5,694,503 | 12/1997 | Fleming et al. | 385/37 |
| 5,732,169 | 3/1998 | Riant et al. | 385/24 |
| 5,841,920 | 11/1998 | Lemaire et al. | 385/37 |

FOREIGN PATENT DOCUMENTS 0 721 121 A1   7/1996   European Pat. Off.  ..........  G02B 6/34

OTHER PUBLICATIONS

Arya, V. et al. "Temperature Compensation Scheme for Refractive Index Grating–based Optical Fiber Devices," SPIE 2594:52–59 (Jan. 1996).

Arya, V. et al. (Oct. 1997), "Application of Thin–Film Optical Filters to the Temperature Compensation of Optical Fiber Grating–Based Devices," IEEE Trans Instrum. Measurement 46(5):1173–1177.

Farries, M.C. et al. (1988), "Hybrid DWDM devices utilizing dielectric filters and fiber Bragg gratings," OFC '98 Optical Fiber Communication Conf. and Exhibit, Technical Digest Series, vol. 2, Feb. 22–27, 1998, San Jose, CA, pp. 234–235.

Foote, P.D. (1994) "Fibre bragg grating strain sensors for aerospace smart structures," Second European Conf. on Smart Strutures and Materials, Glasgow, U.K., session 8, p. 290–293.

Friebele, E.J. et al. (1994) "Fiberoptic sensors measure up for smart structures," Laser Focus World, (May) pp. 165–169.

(List continued on next page.)

*Primary Examiner*—John D. Lee
*Assistant Examiner*—Victoria D. Hao
*Attorney, Agent, or Firm*—Greenlee, Winner & Sullivan, P.C.

[57] ABSTRACT

The invention is a temperature compensating structure for a fiber Bragg grating (FBG) contained in optical fiber. The structure comprises two plates made of materials having different temperature coefficients of expansion and bonded together. The optical fiber is bonded to the exposed surface of the plate having the lower temperature coefficient. The structure bends with changes in temperature and produces an elongation of the fiber with decreasing temperature.

43 Claims, 2 Drawing Sheets

OTHER PUBLICATIONS

Hammon, T.E. and Stokes, A.D. (May 1996), "Optical fibre Bragg grating temperature sensor measurements in an electrical power transformer using a temperature compensated optical fibre Bragg grating as a reference," Eleventh Int'l. Conf. on Optical Fiber Sensors—Advanced Sensing Photonics, Part vol. 1, pp. 566–569.

Henriksson, A. et al. (1996), "Temperature insensitivity of a fiber optic Bragg grating sensor," Proc. SPIE 2839:20–33.

Iwashima, T. et al. (Feb. 1997), "Temperature compensation technique for fibre Bragg gratings using liquid crystalline polymer tubes," Electron. Lett. 33(5):417–419.

Kersey, A.D. (Jan. 1993), "Fiber–optic Bragg grating strain sensor with drift–compensated high–resolution interferometric wavelength–shift detection," Opt. Lett. 18(1):72–74.

Liu, Y. et al. (Oct. 1997), "Temperature insensitive fiber grating," Chinese J. of Lasers 24(10):895–898.

Weidman, D.L., et al. (1996), "A novel negative expansion substrate material for athermalizing fiber bragg gratings" $22^{nd}$ European Conference on Optical Communication, Oslo, Norway.

Yoffe, et al. (Oct. 1995) "Passive temperature–compensating package for optical fiber gratings" Applied Optics 34(30):6859–6861.

Yoffe, et al. "Temperature–Compensating Mounts for optical Fibre Bragg Gratings" ACOFT '94, pp. 262–265 (1994).

Yoffe, et al. "Temperature–compensated optical–fiber Bragg gratings" OFC '95 Technical Digest, W14–pp. 134–135 (1995).

TEMPERATURE COMPENSATED FIBER BRAGG GRATINGS

CROSS-REFERENCE TO RELATED APPLICATIONS

This application takes priority under 35 USC § 119(e) to U.S. provisional application Ser. No. 60/031,562, filed Dec. 3, 1996; which is C-I-P of U.S. application Ser. No. 08/833,602, filed Apr. 9, 1997 (U.S. Pat. No. 5,838,437); and which is C-I-P of application Ser. No. 08/897,474, filed Jul. 21, 1997, (U.S. Pat. No. 5,892,582), all of which are incorporated in their entirety by reference herein.

FIELD OF THE INVENTION

This invention relates generally to optics systems (including communications) and optical waveguides and more particularly to the temperature compensation of optical fibers and fiber Bragg gratings.

BACKGROUND OF THE INVENTION

The development of in-fiber Bragg gratings (FBGs) has led to their use in wavelength measuring systems for sensor and telecommunications systems as well as for wavelength division multiplexing, dispersion compensation, laser stabilization and erbium gain flattening, all around 1550 nanometer wavelengths. These applications depend on FBG wavelength references which either do not change with temperature or change in a predictable manner.

Control of the thermal response characteristics of FBGs is important to achieve an accurate wavelength reference, or wavelength-selective passive component. Control of thermal response characteristics can provide FBGs with low temperature coefficients. Also, the temperature coefficients of FBGs can be tailored to match, or track, the temperature coefficients of other components used in an optical wavelength reference system. For example, the FBG can be used as a marker to identify a particular wavelength in the comb of wavelengths produced by a fiber Fabry Perot filter when the wavelengths of the comb drift with temperature.

Accurate wavelength referencing requires either temperature calibration or temperature compensation, or else temperature control, of the wavelength reference devices. In the latter case, thermoelectric heater/coolers requiring high electrical power consumption, generally precluding battery operation, are needed in the referencing systems. Portable test sets therefore can not easily use such temperature-controlled references. Temperature compensation or calibration is the more practical technique, with compensation being preferred since it provides an independent reference which requires no correction calculations.

Various methods have been devised for providing temperature independence for the wavelengths of FBGs. These methods range from active systems, which utilize feedback to monitor and dynamically control certain parameters, to passive devices which utilize the thermal characteristics of materials to control the sensitivity of the FBG wavelength to temperature. Passive devices are more desirable since they are much simpler and require no power source. The wavelength of an FBG is determined by the index of refraction of the fiber and the spacing of the grating, both of which change with temperature. The index of refraction dominates in the sensitivity of wavelength to temperature. However, since the index of refraction is not easily controlled, passive temperature compensation devices generally operate by controlling the elongation with temperature of the optical fiber containing the FBG. This is usually accomplished by clamping the fiber containing the FBG into a mechanical structure made of materials having different, but usually positive, temperature coefficients of expansion. The structure is arranged such that different rates of expansion between the structural members supporting the fiber result in a negative elongation of the fiber with increasing temperature. Typically the fiber is stretched at low temperatures and is allowed to relax as temperature is increased. An example of this method is described in U.S. Pat. No. 5,042,898. Another passive method of temperature compensation involves attaching the fiber containing the FBG to a material having the desired negative temperature coefficient of expansion, such as described in a paper, presented at the 22nd European Conference on Optical Communication (ECOC '96) in Oslo, by D. L. Weidman, G. H. Beall, K. C. Chyung, G. L. Francis, R. A. Modavis and R. M. Morena of Corning Incorporated, Science and Technology Division, Corning, N.Y.

The passive methods described in the preceding paragraph have the disadvantages of being relatively massive, as in the first method, or requiring very careful control of the formulation of materials to obtain the desired negative temperature coefficient of expansion, as in the second method. It is therefore an object of this invention to produce a small, simple and inexpensive device which can provide passive temperature compensation for FBGs and whose characteristics can be precisely controlled during manufacture.

SUMMARY OF THE INVENTION

In general, this invention relates to a structure and method for temperature compensation of a section of optical fiber. The structure and method are useful for limiting any change in optical properties of the section of otical fiber or optical structures (e.g., gratings, Fabry-Perot cavities, and the like) within that fiber section with temperature.

More specifically, the invention provides a device for limiting the change in the reflected and transmitted wavelengths of a fiber Bragg grating with a change in temperature. The structure of the device forces an elongation of the fiber containing the grating with decreasing temperature, or a shortening of the fiber with increasing temperature. The structure comprises a stack, or sandwich, of at least two members having at least two different temperature coefficients of expansion (TCE) with each member having an interface surface bonded to an interface surface of each adjacent member. The fiber containing the Bragg grating is attached to a mounting surface on the first member in the stack, the first member having a TCE equal to the lowest TCE in the stack. The mounting surface is located on the opposite side of the first member from the interface surface.

If the temperature of the structure increases, the first member expands at a lower rate than at least one of the other members causing the structure to bend with its concave side toward the fiber. The first member bends around a shorter radius than the other members and the fiber, which is attached to the increasingly concave mounting surface of the first member, bends around an even shorter radius than the first member. As a consequence, the length of the fiber decreases thereby compensating for the effects of the increasing temperature.

Conversely, if the temperature of the structure decreases, the first member contracts at a lower rate than at least one of the other members causing the structure to bend with its convex side toward the fiber. The first member bends around a longer radius than the other members and the fiber, which is attached to the increasingly convex mounting surface of the first member, bends around an even longer radius than the first member. As a consequence, the length of the fiber increases thereby compensating for the effects of the decreasing temperature.

Structures and methods of this invention can provide FBGs with temperature coefficients of wavelength less than or equal to one picometer per degree Celsius.

In the preferred embodiment, only two members are used. The first member has the form of a bar made of a very low TCE material such as quartz and the second member has the form of a plate made of a substantially higher TCE material such as stainless steel or copper. The bottom surface of the bar is bonded to the top surface of the plate by methods well known to those skilled in the art of glass-to-metal bonding techniques. The fiber is bonded to the top surface of the bar.

In the preferred embodiment, the plate is made wider than the bar to achieve overcompensation and to permit making fine adjustments to the degree of compensation by measuring the compensation after assembly and trimming the width of the plate to reduce the amount of compensation to the desired value. The trimming capability permits the use of inexpensive standard-tolerance materials to achieve precision temperature compensation.

The invention provides a temperature compensated FBG device only slightly larger than the FBG itself which can be made of inexpensive materials without precision machining.

DESCRIPTION OF THE PREFERRED EMBODIMENT

Figure 1:
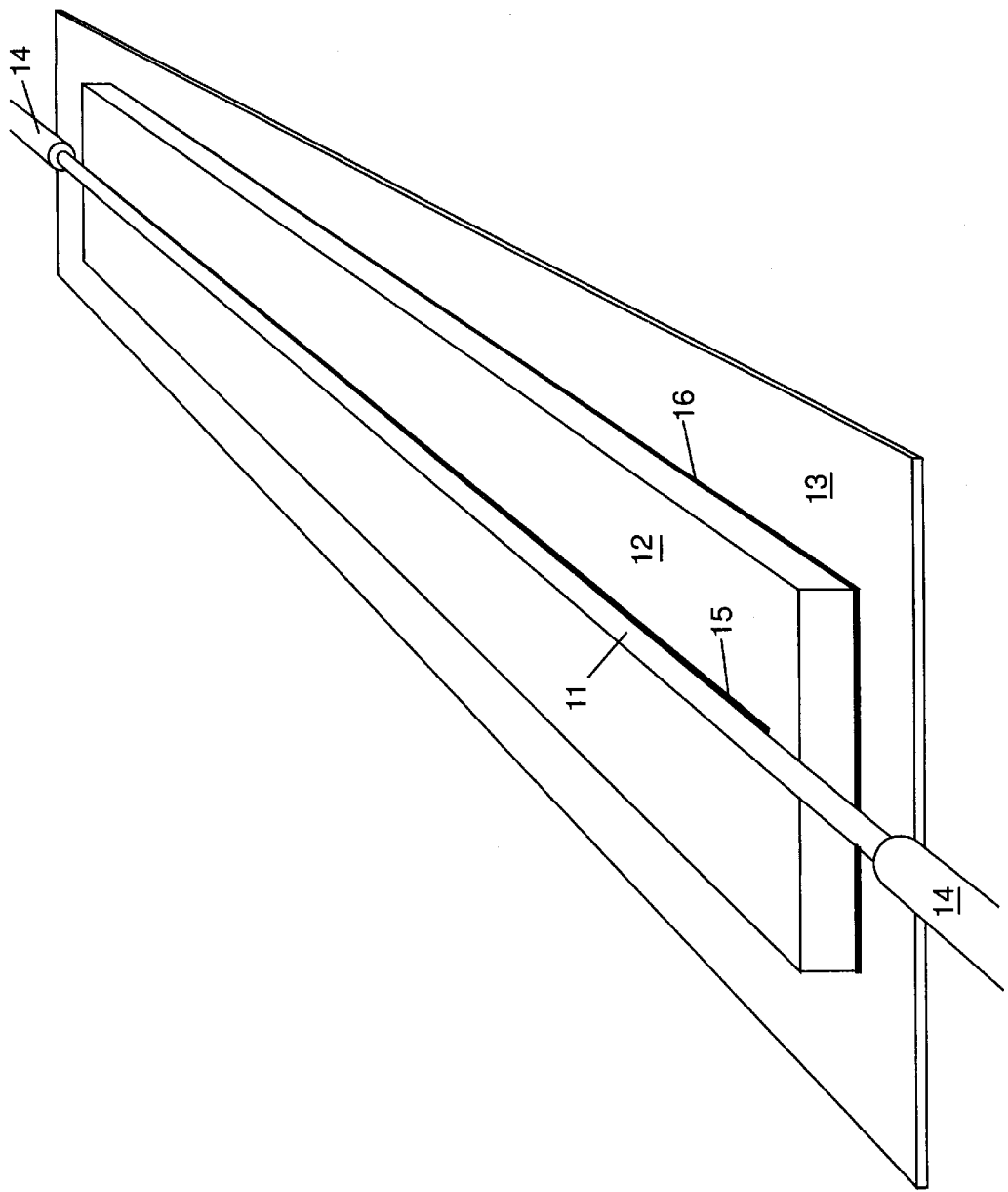
FIG. 1 is a schematic drawing of a temperature compensated FBG.

In the drawings, like reference numerals indicate like features; and, a reference numeral appearing in more than one figure refers to the same element. The drawings and the following detailed descriptions show specific embodiments of the invention. Numerous specific details including materials, dimensions, and products are provided to illustrate the invention and to provide a more thorough understanding of the invention. However, it will be obvious to one skilled in the art that the present invention may be practiced without these specific details.

The structure of the preferred embodiment is shown in the perspective drawing of FIG. 1. The structure combines a bar 12 of low-temperature coefficient material, e.g., quartz, ceramic or low-expansion metal, with a thinner and wider plate 13 of higher coefficient material, such as stainless steel. The top surface of plate 13 is attached to the bottom surface of bar 12 by first bond 16. The optical fiber 11 containing the FBG is attached to the top surface of bar 12 by a second bond 15. Fiber 11 is normally enclosed in a coating 14 except for the section, in the vicinity containing the FBG, which is bonded to bar 12.

In a preferred embodiment, the bar and the plate have about 20–50% greater length than the portion of the fiber being temperature compensated. The width of the bar is about 12 times the diameter of an unclad fiber and the width of the plate is about two times that of the bar. The height (thickness) of the bar is about 2 to 3 times the diameter of the unclad fiber and the height of the plate is about one sixth that of the bar.

For use with standard FBGs having a grating length of 10 mm, a preferable length for both bar 12 and plate 13 is about 15 mm. In such a configuration, using quartz and stainless steel, preferably bar 12 can be about 1.5 mm in width and plate 13 can be about 3 mm in width. Also preferably, bar 12 and plate 13 can be about 0.3 mm and 0.05 mm in thickness, respectively. Bond 15 is preferably made by a heat cured epoxy and bond 16 is preferably made by soldering plate 13 to a metallized surface on the bottom of bar 12. For ease of manufacturing, plate 13 may be slightly longer than bar 12 as shown in the drawings, although end effects are minimized when the bar and the plate have equal lengths.

Figure 2:
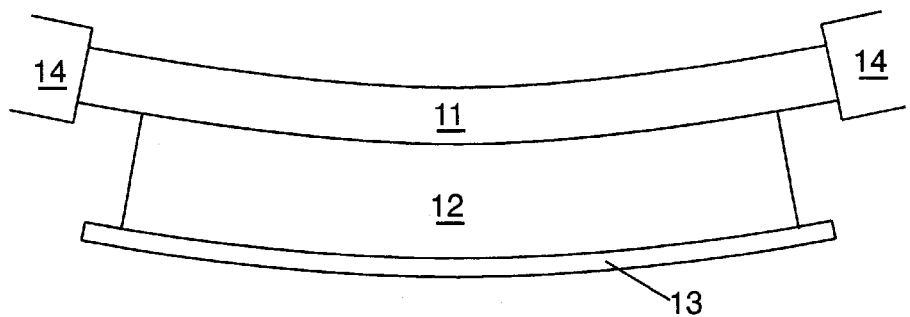
FIG. 2 is a schematic diagram of the FBG of FIG. 1 in a high temperature state.
Figure 3:
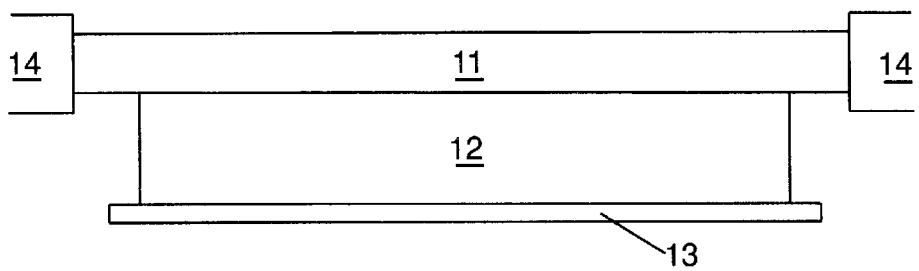
FIG. 3 is a schematic diagram of the FBG of FIG. 1 in a nominal temperature state
Figure 4:
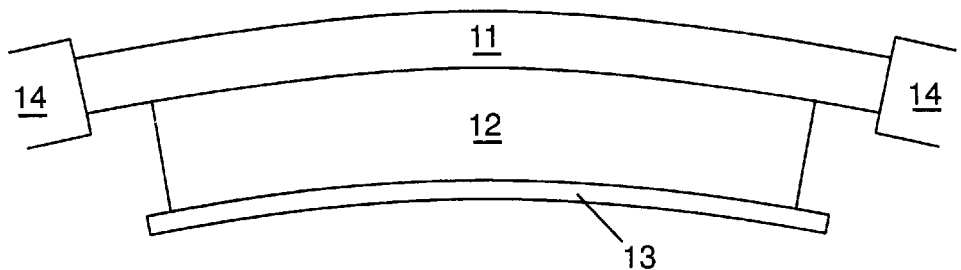
FIG. 4 is a schematic diagram of the FBG of FIG. 1 in a low temperature state.

FIGS. 2, 3 and 4 are schematic side-view diagrams showing the behavior of the device under high, nominal and low temperatures respectively. In each of these drawings, the relative length of the structure is greatly reduced to exaggerate the degree of bending for purpose of illustration.

FIG. 3 shows the structure at a nominal temperature where no bending of the structure occurs.

As illustrated in FIG. 2, as temperature increases the structure bends upward at the ends applying a compression, or reduction in tension, to fiber 11 containing the FBG.

As illustrated in FIG. 4, as temperature decreases the structure bends downward at the ends applying a tension to fiber 11 containing the FBG.

The typical temperature coefficient of reflected wavelength for an FBG is about 10 picometers per degree Celsius. The amount of change in the length of fiber 11 needed to maintain a constant Bragg wavelength is in the range of 1 micron/100° C. for a 10 mm grating length. Experimental results using the structure of FIG. 1, where bar 12 was made of quartz having approximate dimensions of 0.75" long× 0.125" wide×0.0125" thick and plate 13 was made of 300 stainless steel having approximate dimensions of 0.875" long×0.375" wide×0.002" thick, yielded a temperature coefficient of 0.6 pm/°C. The observed amount of bending of the structure was about 5 degrees of arc for a temperature change of 100° C.

In a preferred method of manufacture, after the structure is assembled, it is cured in a fixture which has the amount of curvature, as shown in FIG. 2, appropriate for the elevated curing temperature of the bonding agents. Preferably, the curing temperature is in the range of 100–120° C. In this method, the fiber is relaxed at the highest temperature it will ever encounter and therefore is always under tension during normal operation when typical temperatures are in the range of −40° C. to +80° C. The amount of strain on the fiber during operation is then well within its design limits. However, if the structure is bonded at a temperature lower than the highest operating temperature, it is preferable to place the fiber under sufficient tension during the bonding operation to ensure that it will always be under tension during operation.

Although bond 15 is shown in FIG. 1 as a continuous bond along the length of bar 12, fiber 11 can be attached to bar 12 by spot bonds at the ends of bar 12 to minimize possible effects of the bond on the FBG. However, this may require that fiber 11 be held in tension over the operating range of the device to prevent buckling of the fiber. Also, while a heat-cured epoxy is indicated as the preferred bonding agent for attaching the fiber to the quartz, other materials and techniques may be employed by those skilled in the art.

A preferred method of making bond 16 involves metallizing the bottom surface of bar 12, tinning the metallized surface of bar 12 and the top surface of plate 13 with solder, and then, pressing the tinned surfaces together at a curing temperature sufficient to flow the solder. However, other methods, including among others heat-cured epoxy adhesives, may be employed by those skilled in the art of glass-to-metal bonding. Whwn using a solder bond to a metallized surface on quartz, the use of drawn quartz is preferred because of its smoother surface. However, when other bonding materials such as epoxy are used, a rough or textured surface on the bar or the plate, or both, may provide improved adhesion.

If two metals are used in fabricating plates 12 and 13 of FIG. 1, plate 12 must be fabricated from a metal that has a coefficient of linear expansion no greater than that of quartz to achieve the desired lowering of the temperature coefficient of the design. Low-expansion alloys containing nickel and iron such as "INVAR" (Trademark), ternary alloys of nickel, iron and cobalt, such as "KOVAR" (Trademark), or ternary alloys of iron, chromium and cobalt, such as "ELVINAR" (Trademark) can be used to fabricate plate 12. See: M. A. Hunter (1961) *Metals Handbook,* American Society of Metals, 8th ed. (Taylor Lyman, ed.) Volume 1, p.816–819 for a description of low-expansion metal alloys.

Although only two members are shown and described as the preferred embodiment, either the bar 12 or the plate 13 of FIG. 1, or both, can comprise a vertical stack of multiple layers of materials having the same or different TCEs, bonded together.

While the invention has been described above with respect to specific embodiments, it will be understood by those of ordinary skill in the art that various changes in form and details may be made therein without departing from the spirit and scope of the invention. For example, the invention has been illustrated for the temperature compensation of an FBG. Other optical structures within optical fibers can be temperature compensated using the structures and methods described herein. The invention has been illustrated in the drawings with rectilinear shaped members of proportions comparable to commercially available FBGs; however, members functional in this invention can have a variety of shapes and sizes. Those of ordinary skill in the art will appreciate that there are functional equivalents of the components in the illustrated configurations that can be readily substituted therein or for which ready adaptation is possible. All such variations and functional equivalents are encompassed in this invention.

What is claimed is:

1. A method of temperature compensating a fiber Bragg grating contained in an optical fiber, comprising the steps of:
   providing a first member having a first interface surface, a mounting surface opposite said interface surface for receiving and bonding to said fiber, and having a positive temperature coefficient of expansion;
   providing a second member having a second interface surface and a higher temperature coefficient of expansion than said first member;
   bonding said second interface surface to said first interface surface; and
   bonding said fiber to said mounting surface.

2. A method as in claim 1 wherein said second member has a width substantially parallel to said second interface and substantially perpendicular to said fiber.

3. A method as in claim 2 further comprising the step of trimming the width of said second member to adjust said temperature compensating.

4. A method as in claim 1 wherein said step of bonding said fiber is performed with said fiber under tension.

5. A method as in claim 1 wherein said step of bonding said second interface surface is performed using solder.

6. A method as in claim 1 wherein said step of bonding said second interface surface is performed using heat-cured epoxy.

7. A method as in claim 1 wherein said step of bonding said fiber is limited to bonding discrete spots along said fiber.

8. The method of claim 1 wherein said first member is made of quartz.

9. The method of claim 8 wherein said second member is made of stainless steel.

10. The method of claim 1 wherein said first member is made of low-expansion metal.

11. The method of claim 10 wherein said low-expansion metal is a low-expansion alloy containing nickel and iron.

12. The method of claim 11 wherein said second member is made of stainless steel.

13. The method of claim 1 wherein said first member is made of a metal having a temperature coefficient of linear expansion no greater than that of quartz.

14. A structure for temperature compensating a fiber Bragg grating contained in an optical fiber, comprising:
   a first member, having a first interface surface and a mounting surface opposite said interface surface for receiving and bonding to said optical fiber, and having a positive temperature coefficient of expansion; and
   a second member, having a second interface surface bonded to said first interface surface,
   wherein said second member has a higher temperature coefficient of expansion than said first member.

15. A structure as in claim 14 wherein said first member is a bar having a top mounting surface and a bottom interface surface.

16. A structure as in claim 14 wherein said second member is a plate having a top interface surface.

17. A structure as in claim 14 wherein said plate has a width greater than said bar.

18. A structure as in claim 17 wherein said temperature compensating is adjusted by trimming the width of said plate.

19. A structure as in claim 14 wherein said first member is made of quartz.

20. A structure as in claim 14 wherein said first member is made of drawn quartz.

21. A structure as in claim 14 wherein said second member is made of stainless steel.

22. A structure as in claim 14 wherein said first and second members are bonded together by solder.

23. A structure as in claim 22 wherein said structure is formed into a curve while said first and second members are bonded.

24. A structure as in claim 14 wherein said fiber is bonded to said first mounting surface by heat-cured epoxy.

25. A structure as in claim 24 wherein said structure is formed into a curve while said epoxy is heat-cured.

26. A temperature compensated wavelength reference, comprising:
   a first member, having a first interface surface and a mounting surface opposite said interface surface, and having a positive temperature coefficient;
   a second member, having a second interface surface bonded to said first interface surface an optical fiber bonded to said mounting surface; and a fiber Bragg grating within said optical fiber;

wherein said second member has a higher temperature coefficient of expansion than said first member.

27. A temperature compensated wavelength reference of claim 26 wherein said first member is made of quartz.

28. The temperature compensated wavelength reference of claim 27 wherein said second member is made of stainless steel.

29. The temperature compensated wavelength reference of claim 26 wherein said first member is made of low-expansion metal.

30. The temperature compensated wavelength reference of claim 29 wherein said first member is made of a low-expansion alloy of nickel and iron.

31. The temperature compensated wavelength reference of claim 30 wherein said second member is made of stainless steel.

32. The temperature compensated wavelength reference of claim 26 wherein said first member is made of a metal having a temperature coefficient of linear expansion no greater than that of quartz.

33. A method of temperature compensating a section of optical fiber, comprising the steps of:

providing a plurality of members having different temperature coefficients of expansion, said plurality including a top member and a bottom member, said top member having a bottom interface surface and a top mounting surface, said mounting surface for receiving and bonding to said fiber, said bottom member having a bottom surface and a top interface surface, other said members each having both a top and a bottom interface surface;

bonding said interface surfaces of said members forming a stack of members with said top member at the top of the stack and said bottom member at the bottom of the stack wherein said members are arranged in the stack from bottom to top in order of decreasing temperature coefficients of expansion; and bonding said fiber to said top mounting surface;

wherein the temperature coefficients of expansion of each of said members is positive.

34. A method as in claim 33 wherein said optical fiber contains an FBG.

35. A method as in claim 33 wherein said step of bonding said interface surfaces is performed using solder.

36. A method as in claim 33 wherein said step of bonding said interface surfaces is performed using heat-cured epoxy.

37. A method as in claim 33 wherein said step of bonding said fiber is performed using heat-cured epoxy.

38. A method as in claim 33 wherein said step of bonding said fiber is limited to bonding discrete spots along said fiber.

39. A method as in claim 33 wherein said step of bonding said fiber is performed with said fiber under tension.

40. The method of claim 33 wherein said top member is made of quartz.

41. The method of claim 33 wherein said top member is made of a low-expansion metal.

42. The method of claim 41 wherein said wherein said first member is made of a low-expansion alloy of nickel and iron.

43. The method of claim 33 wherein said top member is made of a metal having a temperature coefficient of linear expansion no greater than that of quartz.

* * * * *

UNITED STATES PATENT AND TRADEMARK OFFICE
CERTIFICATE OF CORRECTION

PATENT NO. : 6,044,189
DATED : March 28, 2000
INVENTOR(S) : Miller

It is certified that error appears in the above-identified patent and that said Letters Patent is hereby corrected as shown below:

Column 4,
Line 19, after temperatures please insert --,--.

Column 5,
Line 8, please replace "Whwn" with --When--.

Column 6,
Line 37, in claim 16, please replace "claim 14" with --claim 15-.
Line 39, in claim 17, please replace "claim 14" with --claim 16--.
Line 63, in claim 26, after "coefficient" please insert --of expansion--.
Line 65, in claim 26, after "surface" please insert --;--.

Column 8,
Lines 27 and 28, in claim 42, please replace "wherein said first member" with --top member--

Signed and Sealed this

Third Day of July, 2001

*Attest:*

NICHOLAS P. GODICI
*Attesting Officer*     *Acting Director of the United States Patent and Trademark Office*